(12) United States Patent
Tsishkou et al.

(10) Patent No.: US 10,776,664 B2
(45) Date of Patent: Sep. 15, 2020

(54) METHOD FOR CLASSIFICATION OF UNIQUE/RARE CASES BY REINFORCEMENT LEARNING IN NEURAL NETWORKS

(71) Applicant: IMRA EUROPE S.A.S., Sophia Antipolis (FR)

(72) Inventors: Dzmitry Tsishkou, Juan-les-Pins (FR); Rémy Bendahan, Juan-les-Pins (FR)

(73) Assignee: IMRA EUROPE S.A.S., Sophia-Antipolis (FR)

( * ) Notice: Subject to any disclaimer, the term of this patent is extended or adjusted under 35 U.S.C. 154(b) by 1 day.

(21) Appl. No.: 16/085,989

(22) PCT Filed: Mar. 15, 2017

(86) PCT No.: PCT/EP2017/056172
§ 371 (c)(1),
(2) Date: Sep. 17, 2018

(87) PCT Pub. No.: WO2017/158058
PCT Pub. Date: Sep. 21, 2017

(65) Prior Publication Data
US 2019/0122077 A1 Apr. 25, 2019

(30) Foreign Application Priority Data
Mar. 15, 2016 (DE) .................. 10 2016 204 275

(51) Int. Cl.
*G06K 9/00* (2006.01)
*G06K 9/62* (2006.01)
(Continued)

(52) U.S. Cl.
CPC ......... *G06K 9/6257* (2013.01); *G05D 1/0088* (2013.01); *G05D 1/0231* (2013.01);
(Continued)

(58) Field of Classification Search
CPC ............ G06K 9/6257; G06K 9/00791; G06K 9/4676; G06K 9/623; G06K 9/6259;
(Continued)

(56) References Cited

U.S. PATENT DOCUMENTS 7,610,130 B1 * 10/2009 Dixon .................. B60W 40/08
701/36
7,860,813 B2 * 12/2010 Wang .................... G09B 9/052
706/12

OTHER PUBLICATIONS

Sangheum, H., et al., "Self-Transfer Learning for Fully Weakly Supervised Object Localization," arvix.org, Cornell University Library, 201 Olin Library Cornell University, Ithaca, NY, US, Feb. 4, 2016, XO080681467, pp. 1-9.

(Continued)

*Primary Examiner* — Dhaval V Patel
(74) *Attorney, Agent, or Firm* — Kenealy Vaidya LLP (57) ABSTRACT

Some embodiments are directed to a method to reinforce deep neural network learning capacity to classify rare cases, which includes the steps of training a first deep neural network used to classify generic cases of original data into specified labels; localizing discriminative class-specific features within the original data processed through the first deep neural network and mapping the discriminative class-specific features as spatial-probabilistic labels; training a second-deep neural network used to classify rare cases of the original data into the spatial-probabilistic labels; and training a combined deep neural network used to classify both generic and rare cases of the original data into primary combined specified and spatial-probabilistic labels.

20 Claims, 5 Drawing Sheets (51) Int. Cl.
  *G06N 3/04* (2006.01)
  *G06N 3/08* (2006.01)
  *G06N 20/20* (2019.01)
  *G05D 1/00* (2006.01)
  *G05D 1/02* (2020.01)
  *G06K 9/46* (2006.01)

(52) U.S. Cl.
  CPC ....... *G06K 9/00791* (2013.01); *G06K 9/4676* (2013.01); *G06K 9/623* (2013.01); *G06K 9/629* (2013.01); *G06K 9/6259* (2013.01); *G06K 9/6277* (2013.01); *G06N 3/0454* (2013.01); *G06N 3/08* (2013.01); *G06N 3/084* (2013.01); *G06N 20/20* (2019.01); *G05D 2201/0213* (2013.01)

(58) Field of Classification Search
  CPC ........ G06K 9/6277; G06K 9/629; G06N 3/08; G06N 20/20; G06N 3/084; G06N 3/0454; G05D 1/0088; G05D 1/0231; G05D 2201/0213
  See application file for complete search history.

(56) References Cited

OTHER PUBLICATIONS

Chen, X., et al., "Webly Supervised Learning of Convolutional Networks," 2015 IEEE International Conference on Computer Vision (ICCV), IEEE, Dec. 7, 2015, CP032866473, pp. 1431-1439.

Oquab, M., et al., "Learning and Transferring Mid-level Image Representations Using Convolutional Neural Networks," 2014 IEEE Conference on Computer Vision and Pattern Recognition, IEEE, Jun. 23, 2014, XP032649359, pp. 1717-1724.

Romero, A., et al., "FitNets: hints for thin deep nets," arXiv:1412.6550v4, Mar. 27, 2015, XP055349753, retrieved from the Internet: URL:https://arxiv.org/abs/1412.6550v4 [retrieved on Feb. 27, 2017], pp. 1-9.

Long, M., et al., "Learning Multiple Tasks with Deep Relationship Networks," Jun. 6, 2015, XP055378244, retrieved from the Internet: URL:https://arxiv.org/pdf/1506.02117v1.pdf, [retrieved on Jun. 1, 2017], pp. 1-10.

Lopez-Paz, D., et al., "Unifying distillation and privileged information," Feb. 26, 2016, XP055377961, retrieved from the Internet: URL:https://arxiv.org/pdf/1511.03643.pdf, [retrieved on Jun. 1, 2017], pp. 1-10.

International Search Report and Written Opinion for PCT Patent App. No. PCT/EP2017/056172 (dated Jun. 19, 2017).

\* cited by examiner

METHOD FOR CLASSIFICATION OF UNIQUE/RARE CASES BY REINFORCEMENT LEARNING IN NEURAL NETWORKS

CROSS REFERENCE TO RELATED APPLICATIONS

This application is a national phase filing under 35 C.F.R. § 371 of and claims priority to PCT Patent Application No. PCT/EP2017/056172, filed on Mar. 15, 2017, which claims the priority benefit under 35 U.S.C. § 119 of German Patent Application No. 10 2016 204 275.0, filed on Mar. 15, 2016, the contents of each of which are hereby incorporated in their entireties by reference.

BACKGROUND

Some embodiments of the presently disclosed subject matter relate to machine learning techniques, and more particularly to deep neural networks (DNN) such as deep convolutional neural networks (CNN). In particular, Some embodiments relate to a method of classification of unique/rare cases by reinforcement learning in neural networks. Such rare cases could be defined as a situation or scenario that could be significantly different from all previously learned data and have minor chances to occur in everyday situations.

The method of some embodiments are useful especially in the field of human-assisted or autonomous vehicles using a camera or a depth sensor, such as a Lidar sensor, for detection and avoidance of obstacles to navigate safely through environments.

A related art publication, "Distilling the Knowledge in a Neural Network", Geoffrey Hinton, Oriol Vinyals, Jeff Dean, arXiv:1503.02531, proposes a way of compressing the knowledge of an ensemble of models (lower level of false alarms due to the need of agreement between all models) into a single model using special compression technique. The process of transferring knowledge from an ensemble of models to a single model is called "distillation". It can be done by using class probabilities produced by the ensemble of models as "soft targets" for training a small model. Training can be done by using entirely unlabeled data or by using original training set of data. Although, knowledge could be transferred using completely unlabeled data, this method requires keeping the same number of classes in the target network as in the initial ensemble of networks. Therefore, even the knowledge on how to avoid selected false alarms due to common agreement acquired by an ensemble of networks to be transferred to a single network, it would be bounded within a local neighborhood of feature/decision space of those networks trained on labelled data samples. Thus, it will not be able to cope with previously unseen data samples efficiently at the classification stage.

Another related art publication, "Generative Adversarial Networks", Ian J. Goodfellow, Jean Pouget-Abadie, Mehdi Mirza, Bing Xu, David Warde-Farley, Sherjil Ozair, Aaron Courville, Yoshua Bengio, arXiv:1406.2661, discloses the use of an adversarial process of simultaneous training of both generative and discriminative models. Generative models should model data distribution from previously labelled data samples in order to be able to synthesize new data samples. The discriminative model must or should be trained to estimate the probability of this new sample being from the training data set rather than generated by the model. This repetitive process corresponds to a minimax two-player game, where reinforcement learning leads to an improvement of the discriminative model. The major drawback of this system is twofold. First, two models are operating in the same feature space bounded by the labelled data samples, which leads to very limited improvement of classification of samples that are substantially different compared to those presented in the labelled data set. Even the generative model is producing novel samples; they can be interpreted as a linear combination of features learned from labelled samples, so it cannot model genuinely novel data. Second, while at initial stages, this method could locally improve decision space, it will not be able to efficiently explore its unknown areas due to the weak feedback from discriminative model's evaluation, which should lead to fast saturation of reinforcement process.

Another related art publication, "Explaining and Harnessing Adversarial Examples", Ian J. Goodfellow, Jonathon Shlens, Christian Szegedy, arXiv:1412.6572, discloses Deep Neural Networks that can be easily fooled by adding random noise to specific image locations, which is a potential source of false alarms. It is proposed to employ a second-order method to search for minimal distortion of initial images samples that leads to false classification by generating slight deviations on it—modified images are called adversarial examples. They could be generated by back-propagating the loss from the classifier. It requires two passes of the network for every image sample. This method could be considered as another form of data augmentation. However since such method is only limited to data augmentation from existing labelled data samples, it cannot solve problem of misclassification of objects which have different visual appearance as for example rare/unseen/unique objects.

Another related art publication, "The Virtues of Peer Pressure: A Simple Method for Discovering High-Value Mistakes", Shumeet Baluja Michele Covell, Rahul Sukthankar, CAIP 2015, proposes a method to efficiently and intuitively input instances that are misclassified by neural networks. It is proposed to train a basket of N similarly "peer networks" which should provide consistency pressure on each other. When an example is found for which a single network disagrees with all other networks, which are consistent in their prediction, that example is considered as a potential mistake. It is also proposed to generate mistakes by modifying original data using data augmentation transformations, such as translation, rescale, color change, etc. All the potential mistakes are later added to the training data set in order to improve classification accuracy. Further version of this technique supposes that instead of geometrical transformations done on original images, peer networks could be applied to classify image time series of an object in video, and for those frames, where networks disagree the most, could be considered as mistakes used to augment the training data set. In this way, video provides much richer source of data. Although degree of variability of data augmentation could be extended by using object tracking, it would still be limited by collecting data in a local space, which originated by training on labelled data samples. Since peer networks learned in a similar manner on similar labelled data, they will not be able to consistently classify previously unseen/rare/unique data. We should expect their confident agreement on visually similar data samples to previously learned data, and disagreement or non-confident agreement for new data samples. Therefore, it could not be expected consistent improvement of feature/decision space for those new data samples, which is a key action required to improve classification accuracy.

The related art publications propose solutions to the problem of misclassification of rare/unseen/unique data via various kinds of data augmentation, where new data samples (misclassified by current deep neural networks) are generated by modifying existing labelled data samples or using various time instances of unlabeled data samples (but visually similar to previously learned data samples) via tracking in video. Although the problem of interest can be largely solved with a deep neural network avoiding misclassification of previously unseen but visually similar data samples to those available during initial training, it cannot consistently improve accuracy for visually non-similar data samples, which were not used during training. One solution could be based on using extremely large datasets of labelled data to minimize number of visually non-similar unseen data samples, but this would be an exponentially expensive data collection task hardly possible in practice.

SUMMARY

Some embodiments of presently disclosed subject matter therefore address or overcome the above-mentioned drawbacks of the related art by using a deep neural network combining feature spaces as well as decision spaces in which both visually similar and visually non-similar misclassification data samples could be hosted and classified.

Some embodiments therefore relate to a method of image processing including:
  capturing image data as original data (Data-A);
  supplying unlabeled images as unlabeled data (Data-C) on a higher scale than original data (Data-A);
  reinforcing deep neural network learning capacity to classify rare cases amongst captured image data, including the sub-steps of:
    training a first deep neural network (DNN-A) used to classify generic cases of the original data (Data-A) into specified labels (Label-A);
    localizing discriminative class-specific features within the original data processed through the first deep neural network and mapping the discriminative class-specific features as spatial-probabilistic labels (Label-B);
    training a second-deep neural network (DNN-C) used to classify rare cases of the original data into the spatial-probabilistic labels; and
    training a combined deep neural network (DNN-D) used to classify both generic and rare cases of the original data into primary combined specified and spatial-probabilistic labels (Label-A+B*).

Advantageously or preferably, the image processing method according to some embodiments include:
  training a first deep neural networks (DNN-A) by supplying the original data containing generic and rare cases and specified labels (Label-A); and outputting at least one class-specific feature space and at least one decision space used to classify generic cases of the original data into the specified labels;
  localizing discriminative class-specific features (HEAT-B) within original data processed through the at least one class-specific feature spaces of the first deep neural networks and mapping the discriminative class-specific features on the original data as spatial-probabilistic labels (Label-B);
  training a second-deep neural network (DNN-C) by supplying original data and the spatial-probabilistic labels; and outputting at least one universal feature (i.e. non class-specific feature) space and at least one universal decision (i.e. non class-specific decision) space used to classify rare cases of the original data into (resized) spatial-probabilistic labels (Label-B*);
  training a first combined deep neural network (DNN-D) by supplying the original data, the specified labels (Label-A) and the spatial-probabilistic labels (Label-B*); and outputting primary combined class-specific and universal feature/decision spaces used to classify both generic and rare cases of the original data into primary combined specified and spatial-probabilistic labels (Label-A+B*);
  further training of the combined deep neural network (DNN-D) by supplying unlabeled data (Data-C); classifying the unlabeled data into the primary combined specified and spatial-probabilistic labels (Label-A+B*); and mapping the primary combined specified and spatial-probabilistic labels (Label-A+B*) into secondary combined specified and spatial-probabilistic misclassification labels (Label-C);
  training a second combined deep neural network (DNN-F) by supplying the unlabeled data (Data-C), the secondary misclassification labels (Label-C) and a penalty matrix; and outputting secondary combined decision and feature (FC-C→A→D→F; Conv-C→A→D→F) spaces used to classify both generic and rare cases of the unlabeled data (Data-C) into the secondary misclassification labels (Label-C) according to the penalty matrix;
  classifying generic and rare cases based on the captured images.

Such an image processing method uses a deep neural network combining universal and class-specific spaces in which both visually similar and visually non-similar misclassification data samples can be easily hosted and classified. More particularly, in the first deep neural networks, trained feature space filters non-discriminative information, which serves as a pre-filter to find the most discriminative information on the next step. The localizing and mapping step adds a spatial and probabilistic dimension of labelling information associated with original images. During the training step of a second-deep neural network, this information is used to make a universal feature space based on the discriminative class-specific features, by removing class-specific information. Both the class-specific feature space and the universal feature space are complementary to handle efficiently visually similar and visually non-similar misclassification data samples. Further, during a training step of a first combined deep neural network, by combining both universal and class-specific feature spaces, all rare cases are automatically clustered allowing better focus training process on these rare cases and therefore improved learning capacity of the overall deep neural network which results in an increased accuracy to detect rare cases and to reduce false alarms.

Furthermore, the method forms new misclassification labels around each group of misclassification errors hosted in the new primary combined class-specific and universal feature/decision spaces. By using a large source of unlabeled data (which could be any kind of natural images/videos), it is possible to ensure to collect enough data samples, so that many visually similar data to the one previously rare/unique/unseen cases (from the training labelled data viewpoint of the first deep neural network) would be used by a further deep neural network that could construct adequate feature/decision spaces, in which both generic and rare cases would have high accuracy of classification.

In addition, using a large source of unlabeled data allows the second combined deep neural network to construct adequate feature/decision spaces, in which both generic and rare cases have high accuracy of classification.

Human knowledge on a priority importance of misclassification between selected pairs of labels is introduced in the form of a penalty matrix, which is used to control distribution of unlabeled data samples used for training, in order to re-balance future misclassification mistakes for each rare/unique case according to prior estimates of application-level risk (defined as penalty for misclassification between each pair of labels in the penalty matrix). Such penalty matrix could be defined automatically prior to the training stage or re-defined by human experts at each iteration of the reinforcement loop.

Advantageously or preferably, the first, second and combined deep neural networks are convolutional neural networks. In such a case, the different deep neural networks allow to use bi-dimensional inputs.

Advantageously or preferably, the localizing step of discriminative class-specific features (HEAT-B) can include or can consist of:
  randomly extracting patches of the original data processed through the at least one class-specific feature spaces;
  ranking randomly extracted patches by their statistical popularity among all patches of a same specified label (Label-A);
  bagging visual words features starting from the top-ranked patches;
  random forest tree classifying of bag of visual words features;
  extracting variable importance measures using the random forest tree classification to localize discriminative class-specific features and estimate their relative importance.

Such steps of localizing and mapping discriminative class-specific features reformulate way of defining a regularization process for feature/decision space creation by deep neural networks, which are using a loss function working with specified labels into the process that uses spatial-probabilistic labels related to spatial locations and corresponding probability of the most discriminant features (i.e. non-class specific) in the form of a heat map. Such a feature/decision space creation process allows to train feature/decision space of universal features, which are complementary to class-specific features. Combination of both feature spaces makes it then possible to train a deep neural network that can confidently discriminate between various types of misclassification errors since it can also discriminate by universal features, which were previously indistinctly merged in class-specific only feature/decision spaces.

Advantageously or preferably, the randomly extracted patches are with high level of activation of the original data processed through the at least one class-specific feature spaces; bag of visual words features are done for highly ranked patches and the extracted variable importance measures are using the random forest tree classification to localize highly discriminative class-specific features.

Advantageously or preferably, the training step of the second-deep neural network (DNN-C) further includes:
  resizing spatial-probabilistic labels (Label-B);
  creating batches (or mini-batches) of original data with corresponding resized spatial-probabilistic labels to learn universal feature and decision spaces via back-propagation of feedback generated by a universal loss function;
  estimating localization and probability of the discriminative class-specific features independently from specified labels (Label-A);
  classifying rare cases of the original data into resized spatial-probabilistic labels (Label-B*).

Such a training step of the second-deep neural network ensures to resize the heat map received from the previous step, to learn the universal feature/decision spaces corresponding to the discriminative class-specific features and classify rare cases into the resized spatial-probabilistic labels.

Advantageously or preferably, the training step of the first combined deep neural network (DNN-D) further includes:
  combining at least one universal feature space and at least one class-specific feature space into at least one integrated feature space forming the primary combined class-specific and universal feature space with different learning rates;
  combining at least one universal decision space and at least one class-specific decision space into at least one integrated decision space forming the primary combined class-specific and universal decision space;
  using a combined loss function of the universal loss function of the second-deep neural network and a class-specific loss function of the first deep neural network to provide feedback for original data belonging to any label out of the primary combined specified and spatial-probabilistic labels (Label-A+B*).

Combination or fusion of universal and class-specific feature/decision spaces allows training such combined deep neural network with any kind labelled or unlabeled data.

Advantageously or preferably, the learning rate of the universal feature space is smaller than the learning rate of the class-specific feature space.

Advantageously or preferably, the training step of the second combined deep neural network (DNN-F) further includes:
  starting from trained first combined deep neural network (DNN-D);
  extending feature and decision spaces by adding hidden layers if required, with a purpose to increase network's capacity to host newly learned features and decisions;
  modifying a loss function of the second combined deep neural network or batches of unlabeled data by using more data samples for the rare cases, with higher penalty on misclassification based on the penalty matrix.

More generally, the method of some embodiments define new misclassification labels for the loss function of the second combined deep neural network which then will better learn feature/decision space in locations of unseen/rare misclassification mistakes, as sub-labelling of mistakes related to original specified labels can be done in the combined universal/class-specific feature/decision spaces from the first combined deep neural network. Further, it can then use unlabeled data to feed the first combined deep neural network (DNN-D) and collect enough data samples for each newly defined sub-labels of mistakes. Then by training another (second) deep neural network (DNN-F) that was advantageously or preferably pre-trained from the first combined deep neural network (DNN-D) on newly collected data samples from originally unlabeled data source, combined feature/decision space in previously unseen/rare locations can be efficiently improved.

Advantageously or preferably, the method of some embodiments further includes:

training a third combined deep neural network (DNN-G) by:
   supplying original data (Data-A) containing generic and rare cases, specified labels (Label-A) and the penalty matrix; and
   outputting primary combined decision and feature spaces used to classify both generic and rare cases of the original data into the specified labels according to the penalty matrix.

Advantageously or preferably, the training step of the third combined deep neural network (DNN-G) further includes:
   starting from trained second combined deep neural network (DNN-F) on the unlabeled data (Data-C) and the secondary misclassification labels (Label-C);
   extending feature and decision spaces by adding hidden layers;
   modifying a loss function (Loss-A) of the third combined deep neural network or batches of unlabeled data by using more data samples for the rare cases, with higher penalty on misclassification based on the penalty matrix.

The training step of the third combined deep neural network (DNN-G) uses knowledge transferred from the trained second combined deep neural network (DNN-F) which could classify input unlabeled data into sub-labels of mistakes. This third combined deep neural network (DNN-G) has the same input and out configuration as the initial deep neural network (DNN-A) and thus allows making a big reinforcement loop. By providing more training data samples to train new label for each unique/rare case compared to another unique/rare case, it allows controlling future distribution of misclassification errors in the final (third) combined deep neural network, which is a product of knowledge transfer on how to construct feature/decision spaces that could host generic and rare cases. The reinforcement method should keep further improvements of the final network (DNN-G), since during each iteration new data samples from unlabeled data would be learned.

Advantageously or preferably, the mapping step of primary combined labels (Label-A+B*) into secondary combined misclassification labels (Label-C) together with the training steps of both the second and third combined deep neural networks form a small reinforcement loop; and the steps from the training step of the first deep neural network to the training step of the third combined deep neural network form a big reinforcement loop.

Thus, the initial deep neural network (DNN-A), which was used to initialize learning of unseen/rare case through misclassification mistakes and construction of better feature/decision spaces can therefore be replaced with more accurate and reliable global network (DNN-A to DNN-G) and such entire process can be repeated again. Each reinforcement loop will benefit from learning new information, which has not been been learned at previous stages, that comes from almost unlimited source of unlabeled data, and will therefore not significantly saturate.

In a more general manner, some embodiments bring significant enhancements or improvements to the various related art publications.

In contrast to the related art publication "Distilling the Knowledge in a Neural Network" publication, some embodiments of the presently disclosed subject matter use unlabeled data to construct feature/decision spaces not only near previously learned data samples, but everywhere else by focusing more on unknown locations/areas with high risk of misclassification defined by the penalty matrix. In such a way, some embodiments provide much large and denser coverage of feature/decision space for previously rare/unique/unseen cases, i.e. data samples, which leads to more accurate and robust classification.

In contrast with the related art publication "Generative Adversarial Networks" publication, in some embodiments, by using a complementary universal feature/decision space, that is to say a non-class-specific feature/decision space, it allows to significantly subdivide such feature/decision space into subspaces and by using huge unlabeled source of data it allows to improve classification in each sub-space in a quasi-independent manner. This results to much lower level of reinforcement saturation, comparing to an integral process using two models and only labelled data, since in the case of our reinforcing method, each reinforcement loop explores new (unlabeled) data and therefore has much lower chances to stay in local minimum due to high similarity of current data with previously learned data.

In contrast with the related art publication "Explaining and Harnessing Adversarial Examples" publication, some embodiments address or overcome the problem of data augmentation by using unlabeled data, which has potentially orders of magnitude with higher variability compared to data augmentation from existing labelled data samples), and augmenting feature/decision spaces that allows to specifically search for previously unseen/rare cases that might have high risk of misclassification. Therefore, in some embodiments, it is possible to collect much more adversarial data samples of much higher variability, which leads to construction of better feature/decision spaces and finally to more accurate classification and lower level of false alarms.

In contrast with the related art publication "The Virtues of Peer Pressure: A Simple Method for Discovering High-Value Mistakes" publication, some embodiments, by using combined universal/class-specific feature spaces with non class-specific labels, makes it possible to collect enough data samples from unlabeled data to properly train feature/decision space around any previously unseen/rare data sample with special focus on high application risk according to the penalty matrix, not limited to the locations/areas learned previously using labelled data.

Some embodiments relate to a vehicle including:
   a path capturing unit configured to capture and convert portions of a followed path seen at least from a driver's point of view into a series of digital files, when the vehicle is driven,
   a processing unit, hosting a deep neural network, configured to classify rare cases based on the series of digital files according to the above image processing method;
   a display unit configured to display an information related to the classified rare cases;
   an autonomous driving unit configured to control the vehicle; and
   a decision unit configured to activate at least one of the display unit and the autonomous driving unit depending on the classified rare cases.

According to some other embodiments, the processing unit is configured to be updated online via cloud-computing processing resources or offline in a service mode integrating the latest results of the distributed reinforcement loop process.

BRIEF DESCRIPTION OF THE FIGURES

Other features and advantages of some embodiments will appear more clearly from the following detailed description of particular non-limitative examples of some embodiments, illustrated by the appended drawings where:

FIGS. 2-8 represents stages A-G according to an advantageous or preferred embodiment;

DETAILED DESCRIPTION OF EXEMPLARY EMBODIMENTS

Figure 1:
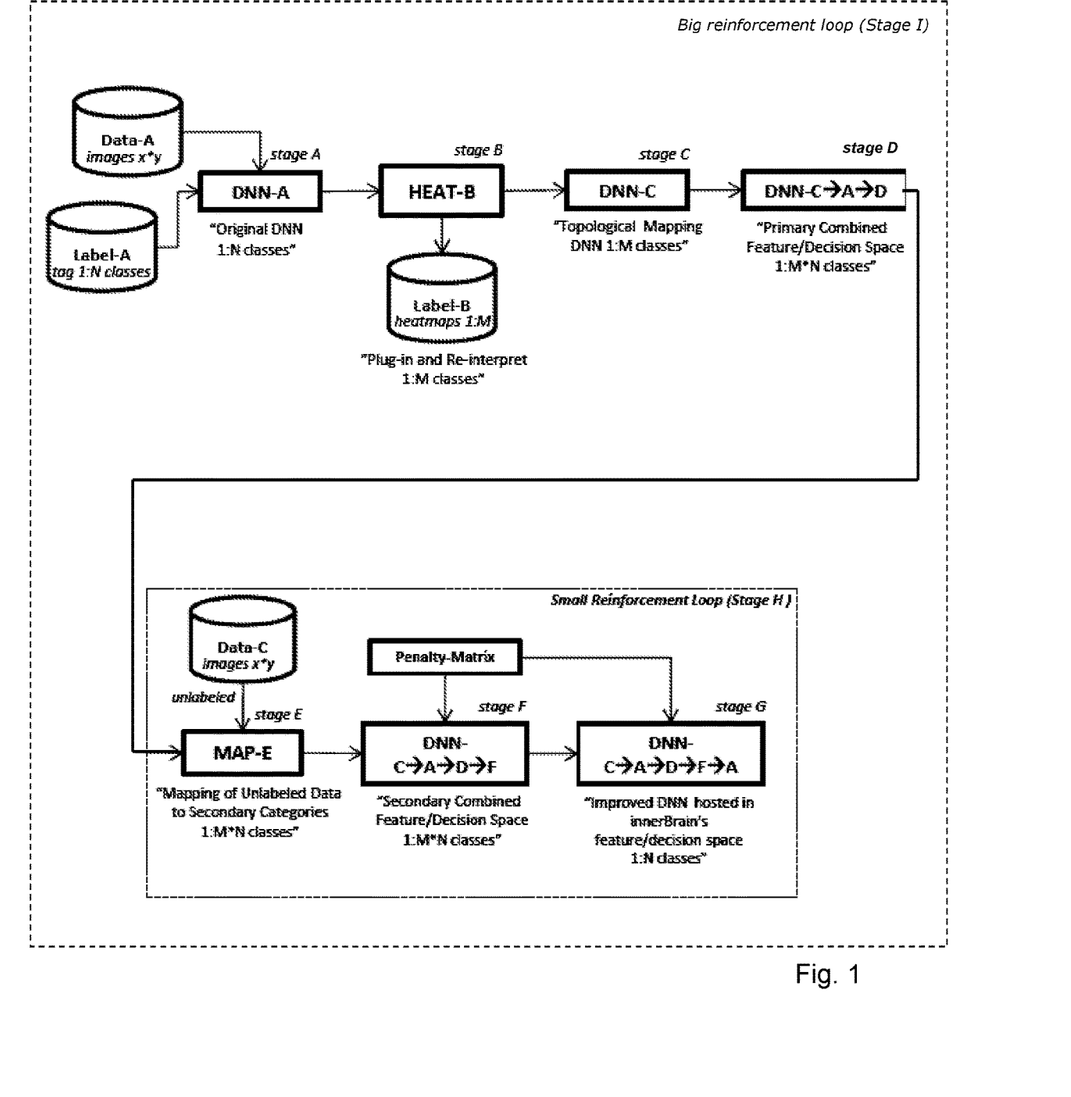
FIG. 1 represents a method to reinforce deep neural network learning capacity to classify rare cases according to an advantageous or preferred embodiment.

FIG. 1 represents a method to reinforce deep neural network (DNN), such as convolutional neural network, learning capacity to classify rare cases according to an advantageous or preferred embodiment.

The whole DNN training process includes several stages A-G forming a big reinforcement loop (Stage I). Within the big reinforcement loop, Stages E-G forms a small reinforcement loop (Stage H).

On entry (Stage A) of the big reinforcement loop corresponding to the whole DNN, original data samples (Data-A), such as image/video data, and specified tags or labels (Label-A) to classify original data samples. On entry (Stage E) of the small reinforcement loop, unlabeled data samples (Data-C) of broad range of categories are supplied. The quantity of unlabeled data, which can be taken from any image/video sources, is typically much higher (more than 100 times) than the original data. A penalty matrix is also supplied to the small reinforcement loop at Stages F and G.

Briefly described, the main goal of the whole DNN is to reinforce training of DNNs using the following algorithm. During Stage A, the algorithm trains a state of the art DNN-A using Data-A and Label-A. During Stages B-D (big reinforcement loop), the algorithm connects to hidden layers of DNNs, reinterprets signal activations as universal features, then makes combined feature/decision spaces (primary spaces) that can properly host/classify rare cases followed by a small reinforcement loop.

During Stages E-G (small reinforcing loop), the algorithm maps the primary spaces into secondary feature/decision spaces and fills them up with unlabeled data; such secondary spaces have enough data samples and layers to learn rare cases as good as generic cases. A penalty matrix gives priors on how feature space should be constructed. Priors refer generically to the beliefs an agent (i.e. the programmer) holds regarding a fact, hypothesis or consequence. Once trained, the secondary feature/decision spaces are warped down to match the state of the art DNN-A's inputs and outputs. During this stages one can't assess quality of the mapping directly, however at least two indirect methods could be used. Firstly, accurate evaluation of DNN-C can be done by further splitting its training data, where ground truth is available, into training/test batches. Secondly, final performance can be correlated with the accuracy of the mapping due to the following. Better mapping would force more visually similar unlabeled images to be grouped together for each anti-class, thus more responsive features/decisions should be learned at stages E-G, leading to higher final accuracy at recognizing both generic and rare cases.

By the way, unlabeled data that may be used do not need to cope with quality requirements. Indeed, any kind of images could be used as unlabeled data even synthetic or randomly generated. Nowadays with access to photo/audio hosting platforms everyone could get billions of images to obtain unlabeled data. Closer the domain of unlabeled images is to the target domain, higher overlap between newly learned features/decision spaces of labelled/unlabeled data would be. Particularly for automotive application any natural/synthetic outdoor or indoor images could be used. Finally image quality or resolution is not an important factor in case of usage of millions of image samples since most of the visual features are repeatable amongst images.

The achieved goal of the whole DNN is to reinforce DNN learning capacity to improve classification accuracy for rare/unique cases according to priors on risk-of-misclassification defined as a penalty matrix (based on general knowledge).

One example of DNN that can be used is Inception-V3 ("Rethinking the Inception Architecture for Computer Vision", Christian Szegedy et al.), more details being given at: https://arxiv.org/pdf/1512.00567v3.pdf.

Stage A

FIG. 2 represents Stage A of training of a first deep neural network (DNN-A).

Supplied data are images (Data-A) and tags (Label-A), where images of x*y are tagged as instances of 1:N classes.

The algorithm trains DNN-A, where both feature space (Conv-A) related to convolutional layers and decision space (FC-A) related to fully connected layers shall be constructed via back-propagation of feedback generated by a loss function (Loss-A) given forward signal from mini-batch of images with tags.

Stage A output includes decision (FC-A) and feature (Conv-A) spaces, which are used by DNN-A to automatically classify Data-A like image instances into Label-A specified tags.

Stage A's goal is that trained feature/decision spaces filter non-discriminative information within Data-A, which serve as pre-filter to find the most discriminative information on the next step.

Stage B

Figure 3:
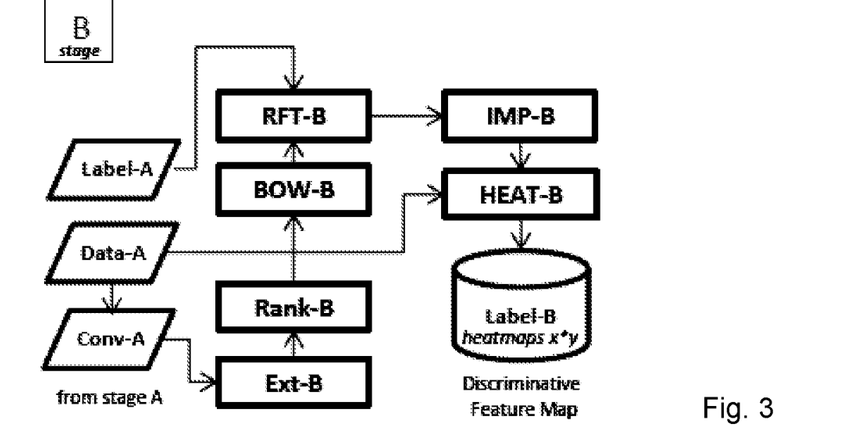

FIG. 3 represents Stage B of "Plug-in" images and tags and "Reinterpret" output of Stage A.

Supplied data are the same as stage A, namely images (Data-A) and tags (Label-A), where images of x*y are tagged as instances of 1:N classes, and the images (data-A) passed through convolutional layers, while keeping only strong activations as input for stage B.

The algorithm finds locations of class-specific highly discriminative features by:

- random extraction of patches (Ext-B) with high level of activations of image signal processed through convolutional layer of DNN-A;
- ranking (Rank-B) of randomly extracted patches (Ext-B) by their statistical popularity among all patches of the same class;
- bag of (visual) words features (BOW-B) using highly ranked patches (rank-B);
- random forest tree (RFT-B) classification of bag of (visual) words features (BOW-B) converted data;
- variable importance (IMP-B) measures using random forest tree (RFT-B) classification results to find most discriminative patches and estimate their relative importance;
- localization (HEAT-B) of most discriminative patches (IMP-B) and mapping on original data as new spatial-probabilistic labels (Label-B; heatmaps x*y).

Stage B output includes heat maps of the most discriminative class-specific features linked with original image data.

Stage B's goal is that the heat maps add new dimension of labelling information associated with original images (spatial-probabilistic+specified class vs. specified class). This information will be used in the next stage to make universal feature space, by removing class-specific information.

More specifically, the random extraction patches can be done from the activation map of a convolutional layer of the deep neural network (e.g. like layer N of Conv-A). Explanation about activation maps can be obtained for example from
https://web.archive.org/web/20160312035123/http://cs231n.github.io/unde rstanding-cnn/.

Each convolutional layer would be used separately for extraction of random patches, so we would make patch ranking for layer 1, layer 2, . . . and later we could select the best result to make a fusion. Also each filter is processed independently, such as activation map of filter m=1:M of constitutional layer n=1:N is used to make patch ranking m, n having totally M*N times required to repeat patch ranking procedure.

Typically we have 64-96 filters in first convolutional layer so that we computed patch ranking process 64-96 times, 128-512 filters in deeper convolutional layers, etc. with a number of convolutional layers from 5 to 100.

Since the activation maps of convolutional layers are sparse, e.g. 96 filters—96 activation maps, where each filter is tuned to respond only to specific signal, high level of activation corresponds to the filter's response level to the input signal (i.e. original image for the first layer, or output of the previous hidden layer) above some threshold. Typically, we can use normalized activation maps and considered high activation level for a random patch to be considered for further processing as having at least 5% of pixels with at least activation level higher than 10% of maximum value in corresponding normalized activation map.

As is regarded in the bag of (visual) words, we can consider for example the top 5% of the most highly ranked patches as visual words, so once all patches for the same class are ranked for each convolutional layer and filter independently, we then take top 5% of patches and consider each patch as visual word. In such case, for each layer/filter pair, we would collect around 200,000 patches per class, rank them by popularity defining a visual similarity threshold between two patches, so that 5,000 total visual words would be defined. In other words, each visual word could be considered as a centroid of a cluster, so that it is somehow analogue to cluster 200,000 patches into 5,000 clusters. Then we can take for example only 256 of visual words (i.e. clusters), with highest population of samples (high rank of patch). On practice, 5% of visual words would correspond to more than 80% of total number of samples. Thus, we can ignore the rest of 95% visual words, corresponding to less than 20% of total samples.

As regard the random forest tree implementation, we can use for example implementation from opencv v 2.4. More details are given here:
https://web.archive.org/web/20160306011014/http://docs.opencv.org/2.4/module s/ml/doc/random_trees.html.

As regard variable importance, a definition can be found here:
https://web.archive.org/web/20160316123038/http://www.inside-r.org/packages/cran/randomforest/docs/importance.

To compute variable importance, we can stack together feature vectors from various filters, so that we could measure not only which visual word is more important within its own filter, but among all filters.

As is regarded in the localization of most discriminative patches, an example in the presently disclosed subject matter is the following. By using BOW concept as feature vector, we train forest tree classifier to discriminate between the class of interest and all other classes. Each visual word is considered as a variable while learning random forest tree classifier, variable importance is computed to estimate how classification performance of the forest tree classifier, that uses 5% of total visual words (since we keep only high discriminative patches ~80% of total population of patches covered) depends on contribution of this visual word. Thus, we can learn which visual words (from 5% kept at previous stage) are more or less important for random tree classifier. Thus any of 5% of visual words can be more or less popular according to the patch ranking, but their popularity is measured only within its own class samples, so by taking 5% of highly ranked patches we ensure to cover 80% of total samples. Then by computing variable importance, we understand on which of these samples random forest tree classifier relies to discriminate between two classes. Indeed, if patch is popular for many classes it would have low variable importance, only patches which are popular within their own class and not popular within other classes would have high importance, since random forest classifier would rely on them.

Further, the heatmap shows most discriminative patches locations on a map in some pre-defined coloured areas (e.g. red), which are spatial-probabilistic labels. Thus, for the initial image labelled according to Label-A, we compute such a heatmap. We could generate heatmaps because randomly extract patches for each filter are localized by their spatial nature (location=center of a patch). We have to consider only patches visually similar to top 5% of highly ranked patches (80% of all patches with activation above threshold would be considered), then the probabilistic nature is given by using a variable importance measure as a weight to estimate the contribution of individual patch into the final heatmap. Since variable importance is computed for all filters together, we could produce combined heatmaps for all filters for each particular convolutional layer by using location of patch*weight of a patch (variable importance). Finally, each heatmap is normalized between min/max values to fit 0:256 range. Such a heatmap is a Label-B sample for corresponding image.

Stage C

Figure 4:
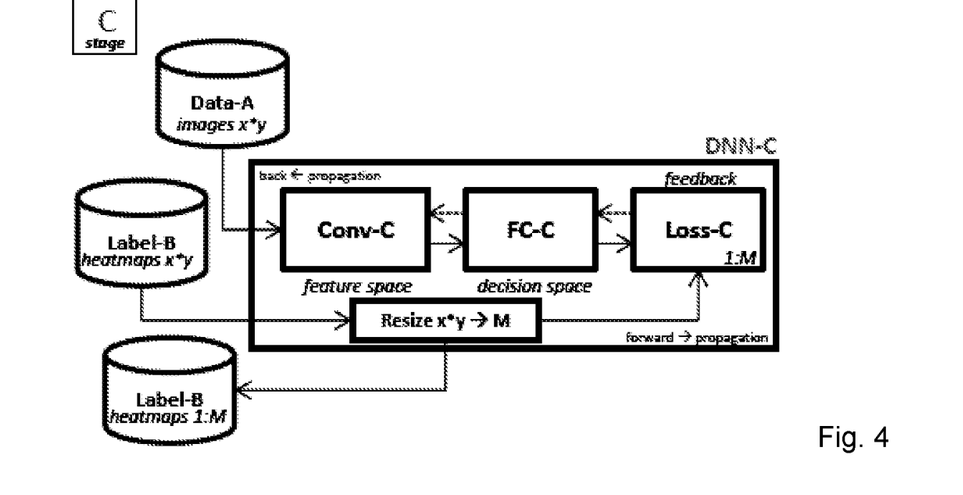

FIG. 4 represents Stage C of topological mapping of a second-deep neural network (DNN-C).

Supplied data are images (Data-A) and new spatial-probabilistic tags (Label-B, heatmaps x*y).

The algorithm trains DNN-C by:
resizing x*y heatmaps from Label-B to M classes, where $1/\sqrt{M}$ is the resolution of spatial-probabilistic labels (Label-B);
creating mini-batches of Data-A with corresponding resized labels from Label-B to learn universal (non-class specific) feature (Conv-C) and decision (FC-C) spaces via back-propagation of feedback generated by the loss function (Loss-C) that encourages DNN-C to estimate location of the most discriminative features (HEAT-B) in an image class independent way.

Stage C output includes decision (FC-C) and feature spaces (Conv-C), which are used by DNN-C to automatically map Data-A like image instances into resized spatial-probabilistic labels (Label-B*; heatmaps 1:M) based on universal feature space.

Stage C's goal is that the universal feature space is complimentary to class-specific feature space (obtained on stage A), so that later fusion of two spaces should improve DNN's learning capacity.

As is regarded, the resolution of spatial-probabilistic labels (Label-B), the maximum resolution is defined by dimension of activation map of convolutional layer, where patches are computed. For example, we can use activation maps of a first convolutional layer of 56×56, thus M is smaller or equal to 56×56. A second consideration is the number of samples we can collect, that corresponds to each of m=1:M classes. We can consider for example that 1.000 samples per 1:M classes is enough to train DNN to a further stage. Thus if we select 56×56 classes (i.e. 3.136) we would need to collect at minimum 3.136.000 samples for training. Since on practice, not all the classes among 1:M have equal distribution of samples, we would need to ensure that each of 1:M classes has at least 1.000 samples, which gives realistic estimate of 10-100× samples needed compared to 3.136.000 estimated previously. Therefore, we decide number of classes M to be less that 56×56 but more than total number of images Data-A divided by 1.000. In the presently disclosed subject matter, data augmentation to increase number of samples by 10-100× for rare classes among M can be used. For instance, if total number of images in Data-A is 1.000.000, M would be defined as 32×32=1.024.

With respect to the resolution of spatial-probabilistic labels, the spatial part is linked to the resolution of the heatmap and defines number of classes M and the probabilistic part defines distribution of samples of each of 1:M classes during training stage, such that samples with labels from Label-B which have higher probability would be overrepresented during training compared to the lower probable samples.

With respect to the mini-batches creation, training stage of DNN is divided into series of smaller stages, where at each smaller stage only a tiny randomly picked portion of data (i.e. mini-batch) is used to compute loss and do back-propagation. This helps to greatly reduce computation complexity and to avoid local minimums. For example, each mini-batch can be composed of 200 randomly chosen samples out of 1.000.000 or more.

With respect to universal features, they are features not linked to a specific class and can be shared among different objects of different classes. During Stage C, we force DNN-C to learn to localize discriminative part of objects and estimate their probability (e.g. how discriminative it is). Compared to Stage-B, where this information was class specific, we translate it into universal one, by mixing samples of all classes from label-A, which have same class M according to label-B into the same category (at Stage-C). Since the output of DNN-C becomes class-agnostic (universal), then features learned by such DNN-C during training are universal as well.

Stage D

Figure 5:
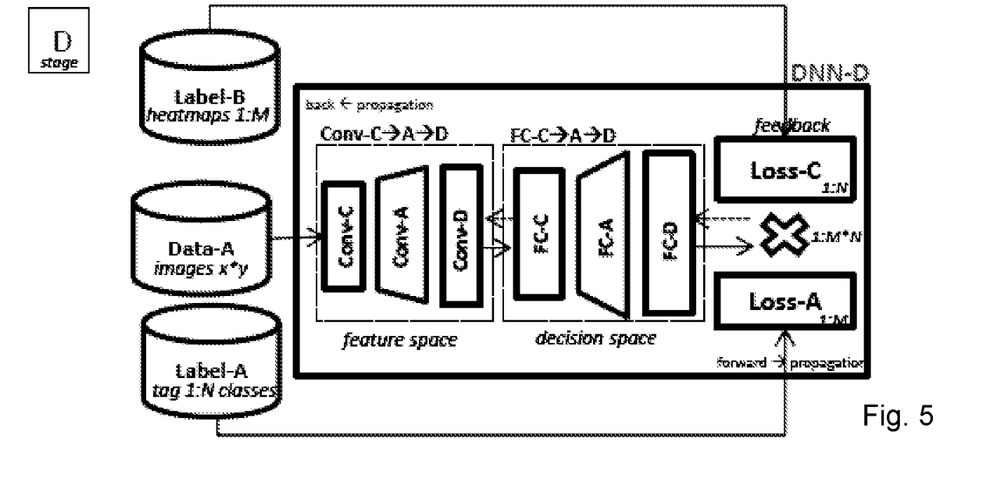

FIG. 5 represents Stage D of primary combined feature/decision space in a primary combined deep neural network (DNN-D).

Supplied data are images (Data-A) and tags (Label-A; 1:N classes) and resized spatial-probabilistic tags (Label-B*; 1:M classes).

The algorithm trains DNN-D by:
combining Conv-C and Conv-A into an integrated feature space (Conv C→A) using pre-training with different learning rates for A and C layers, so that one would warp initial feature space into another, and optionally adding new layers (Conv-D) to learn combined features (Conv-C→A→D);
repeating previous step for decision space to learn combined decision (FC-C→A→D);
using combined loss function of Loss-C and Loss-A to provide feedback for each image signal belonging to one of classes out of M*N.

Stage D output includes decision (FC-C-*A-*D) and feature (Conv-C→A→D) spaces, which are used by DNN-D to automatically map Data-A like image instances into combined universal/class-specific feature space (Label-A+B called "Primary").

Stage D's goal is to combine both universal and class-specific feature spaces, so that all rare cases can automatically be clustered. Many rare cases, which have same class-specific classes (1:N) according to DNN-A, will be repeatedly subdivided into universal/class-specific sub-classes (1:M*N) by DNN-D. Further, even if rare cases present the same class-specific features, they could be distinguished by their universal features which would be different from one rare case to another and then help to better trained on these rare cases and therefore increase accuracy and reduce false alarms.

In DNN-D, we use transfer learning from DNN-A and DNN-C. Thus for example, we can consider universal features to be mostly used at earlier layers, while class-specific at deeper layers. At stage D, we could then consider same configuration of the DNN-D except final fully connected layer, since it would have number of outputs M*N instead of either 1:N for DNN-A or 1:M for DNN-C. For example, we could define DNN-A, DNN-C and DNN-D to have same configuration for all layers expect final fully connected layer. Then, we could start training of DNN-D with labels M*N by initializing all layers expect the final one with those from DNN-C so that we have transfer learning via weight initialization. Therefore, we can stack fully connected layers, since they are going to be re-trained with higher learning rates.

With respect to the learning rates, it defines how important would be changes at each back-propagation stage to the DNN for each layer. For instance, in case of high learning rate, backpropagation would significantly modify DNN connections on each training iteration. In the presently disclosed subject matter, it can be considered for example that first hidden layers are mostly related to DNN-C, while deeper hidden layers are mostly related to DNN-A. If we fix small learning rate for first hidden layers, they would be modified significantly less that other part of the network, so we could consider that most of the universal features would be kept. But since the learning rate is not zero, we still allow these universal features to be slightly adapted to prevent back-propagation from saturation. Then if we use much higher learning rate for deeper layers and fully connected layers, we would almost forget weights as trained in DNN-C and adapt them to better respond to new labels M*N. In this case, since labels would be M*N, we would have transfer learning via labels.

With respect to combined loss function (Loss-D), for example DNN-C is trained to classify input image into 1:M classes, while DNN-A is trained to classify input image into 1:N classes. During stage D, for each input image, for which we already have label n=1:N from Label-A, so we can pass it through DNN-C to estimate label m=1:M. Later, we can construct a combined label mn=n*M+m. In such way, the total number of possible labels for stage D is M*N. As we have pre-trained DNN-D with DNN-C, it would already have features required to predict labels 1:M, knowing that this knowledge was transferred. Then we would train DNN-D on labels mn=1:M*N, so that the loss function would be analogue to combined loss functions (Loss-C and Loss-A). As regard the loss function, since the DNN-D should classify for each input image its category mn out of M*N categories, the cost of misclassification would be 0 if the classification is correct and 1 if the classification is incorrect. Therefore DNN-D would be penalized for non-recognizing object's class 1:N and at the same time not estimating location of the most discriminative features for this object.

Stage E

Figure 6:
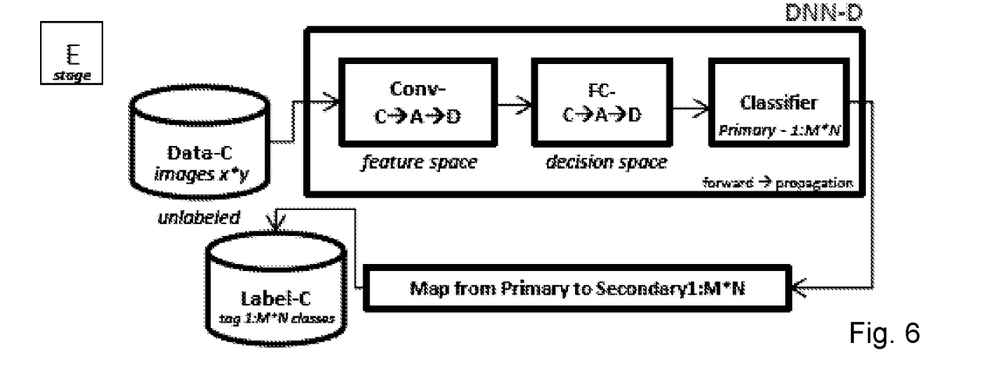

FIG. 6 represents Stage E of mapping unlabeled data to secondary classes.

Supplied data are unlabeled images (Data-C) on a much higher scale than images (Data-A).

The algorithm classifies unlabeled data samples from Data-C by:
  using DNN-D to assign one of 1:M*N universal/class specific tags (Label-A+B called "Primary") to each unlabeled data sample of Data-C;
  mapping from "Primary" category (Label-A+B) into "Secondary" category of previously non-existent kind of object which should be assigned for all objects looking similar (as classified by DNN-D) to "Primary" category of objects, but not belonging to this category in reality. Therefore real "Primary" category is mapped into an imaginary Secondary category (1:M*N).

Stage E output includes assigned tags in Secondary space of 1:M*N classes related to Primary space (Label-C; 1:M*N classes). These assigned tags (Label-C) are also called secondary combined specified and spatial-probabilistic misclassification labels.

Stage E's goal is to usually find enough data samples related each "Secondary" version of rare case by using sufficiently large source of unlabeled data (Data-C), so that DNN-D could be properly trained to accurately classify real rare case vs. rare case false alarms.

With respect to unlabeled image data (Data-C), this data is related to a much larger corpus of data compared to original data (Data-A). Advantageously or preferably, it is required for Data-C to have at least some visually similar samples to those in Data-A. Typically Data-C is 100× or more than Data-A so that the chance of using only portion of unlabeled data that corresponds to specific class is extremely small and therefore can be ignored.

With respect to the "Secondary" category of previously non-existent kind of object, it corresponds to only misclassification errors of DNN-D using unlabeled data. We start with training DNN-D at stage-D to classify images into M*N classes, in other words "Primary" category related to real objects. While, at stage-E we ask a question how misclassification errors that fall in each of M*N categories are different from each other. "Primary" is related to object classification, while "Secondary" is related to error classification. Since many different misclassification errors related to various real objects, previously unlabeled or labelled objects, it could be classified by DNN-D into the same category 1:M*N. We refer to this new "Secondary" category as previously non-existent kind of object.

Stage F

Figure 7:
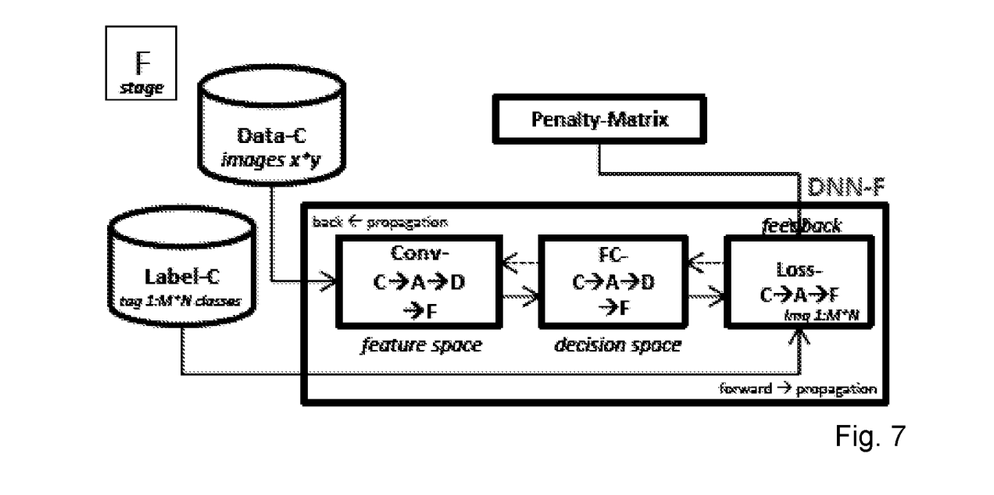

FIG. 7 represents Stage F of secondary combined feature/decision space in a secondary combined deep neural network (DNN-F).

Supplied data are unlabeled images (Data-C) and assigned tags (Label-C), composed of automatically labelled data on the stage E and a penalty matrix.

The algorithm trains DNN-F by:
  starting from pre-trained DNN-D and further extending feature and decision spaces by adding more layers;
  modifying the loss function or composition of mini-batches by using more samples for those rare cases, that have higher penalty on misclassification, using data provided in a penalty matrix.

Stage F output is secondary combined feature/decision spaces constructed in favour of rare case samples with high penalty, according to the penalty-matrix defined offline.

Stage F's goal is to create feature/decision space that hosts best both frequent and rare cases with high risk-level of false alarms, according to prior knowledge, i.e. the penalty matrix.

With respect to the modified loss function step, an example could be as follows: since the DNN-F should classify for each input image its category mn out of M*N categories, the cost of misclassification would be 0 if the classification is correct and 1*(Penalty) if the classification is incorrect. Therefore DNN-F would be penalized for non-recognizing object's class 1:N and at the same time not estimating location of the most discriminative features for this object.

Penalty is defined prior to the training for each pair of N*N classes (independent of M). For example, if such penalty is 1 for all pairs of classes, except class 1 vs. class 2, then the loss function would be similar as in DNN-D for all cases expect if a sample from class M*N (N=1) is misclassified as M*N (N=2), where M could be any. Then the penalty could be defined as 10, thus misclassification error would cost 10× for these cases, compared to others so that at backpropagation stage it would give much greater impact of updating weights of neural network than any other samples. Another form of modification could be related to usage of 10× samples for rare cases related to misclassification of class 1 vs. 2 compared to any other pair of classes. Thus, by artificially using more samples of specific classes, DNN would be forced to better learn features, which are needed to discriminate between them. This would result in better recognition of these errors by final deep neural network in stage G since this knowledge will be transferred.

With respect to the penalty matrix, it could be for example N*N matrix, where N are classes from Label-A. Such matrix is defined by a system engineer using external application knowledge. Each value represents normalized application risk associated with misclassification between specific pair of classes defined by row and column.

Stage G

Figure 8:
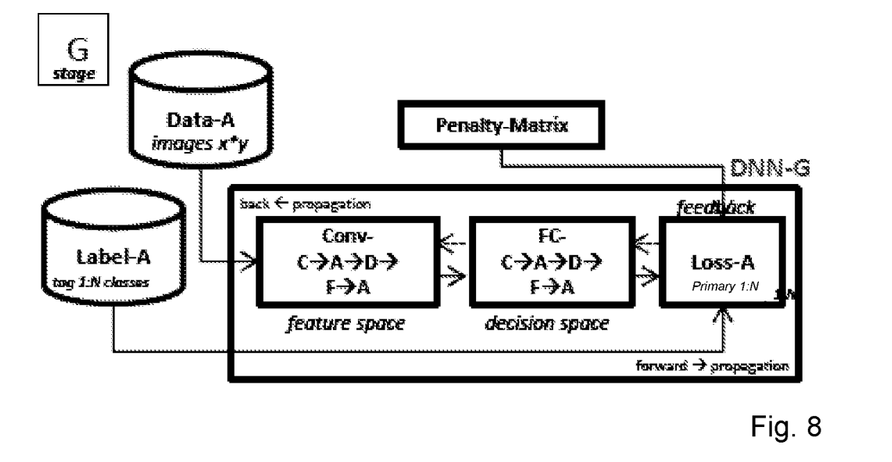

FIG. 8 represents Stage G of training "original" feature/decision spaces hosted in a deep convolutional neural network (DNN-G).

Supplied data are images (Data-A) and tags (Label-A) and a penalty matrix.

The algorithm trains DNN-G by:
  starting from pre-trained DNN-F and further extending feature and decision spaces by adding more layers;
  modifying loss function or composition of mini-batches by using more samples for those rare cases, that have higher penalty on misclassification, using data provided in penalty matrix Stage G output is a primary combined feature/decision space, which is warped from pre-trained secondary space with much larger capacity M*N, constructed in favour of rare case samples with high penalty, according to the penalty-matrix defined offline.

Stage G's goal is the same as on-stage F, with input and output compatible with original data flow of DNN-A to close the reinforcement loop.

With respect to Stage G, since we made sequences of knowledge transfers resulted in our ability to classify rare cases at stage F according to priors defined in penalty matrix, we advantageously or preferably want to stack one fully connected layer at the end of DNN-F, so that this layer re-routes classification results of DNN-F 1:M*N into initial class space of 1:N.

More generally, regarding the whole DNN, at each stage, where DNN is train based on previous knowledge, new knowledge is acquired and further transferred along the chain. With such procedure we are improving feature and decision spaces by collecting more samples near rare cases and far from previously learned samples. This process reduces uncertainty in classifying those samples, which are statistically underrepresented, such are rare/unique cases. At stage-G our feature/decision space initially trained around labelled samples label-A is augmented by universal features and samples near most of the misclassification cases at this stage. Therefore, any of these samples, could be accurately classified.

Figure 9:
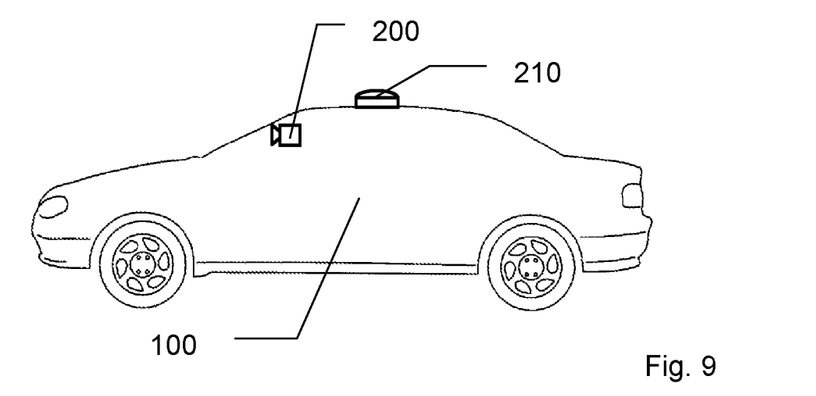
FIG. 9 represents a vehicle equipped with the desired units to implement the method according to some embodiments.

FIG. 9 represents one possible application for some embodiments.

A vehicle 100 is equipped with a path capturing unit (200; 210) configured to capture and convert portions of a followed path seen at least from a driver's point of view into a series of digital files, when the vehicle is driven. Such path capturing unit can be a camera 200 and/or a 360° scanning unit 210, such as a laser light scanning unit (LIDAR), pointing the road ahead to take a video or a continuous series of pictures during a journey.

The vehicle 100 also includes:
a processor, hosting a deep neural network, configured to classify both generic and rare cases based on the series of digital files according the image processing method of some embodiments;
a display configured to display an information related to the classified generic and rare cases;
an autonomous driving unit configured to control the vehicle; and
a decision unit configured to activate at least one of the display unit and the autonomous driving unit depending on the classified rare cases.

It will be understood that various modifications and/or improvements evident to those of ordinary skill in the art can be brought to the different embodiments described in the present description without departing from the scope of the presently disclosed subject matter defined by the accompanying claims.

The invention claimed is:

1. A method of image processing, comprising:
capturing image data as original data;
supplying unlabeled images as unlabeled data on a higher scale than the original data;
reinforcing deep neural network learning capacity to classify rare cases amongst the captured image data, by:
training a first deep neural network by:
supplying the original data containing generic and rare cases and specified labels; and
outputting at least one class-specific feature space and at least one class-specific decision space used to classify generic cases of the original data into the specified labels;
localizing discriminative class-specific features within the original data processed through the at least one class-specific feature spaces of the first deep neural networks and mapping the discriminative class-specific features on the original data as spatial-probabilistic labels;
training a second-deep neural network by:
supplying the original data and the spatial-probabilistic labels; and
outputting at least one universal feature space and at least one universal decision space used to the classify rare cases of the original data into the spatial-probabilistic labels;
training a combined deep neural network by:
supplying the original data, the specified labels and the spatial-probabilistic labels; and
outputting primary combined class-specific and universal feature and decision spaces used to classify both the generic and rare cases of the original data into primary combined specified and spatial-probabilistic labels;
further training of the combined deep neural network by:
supplying unlabeled data;
classifying the unlabeled data into the primary combined specified and spatial-probabilistic labels;
mapping the primary combined specified and spatial-probabilistic labels into secondary combined specified and spatial-probabilistic misclassification labels;
training a second combined deep neural network by:
supplying the unlabeled data, the secondary misclassification labels and a penalty matrix; and
outputting secondary combined decision and feature spaces used to classify both generic and rare cases of the unlabeled data into the secondary misclassification labels (Label-C) according to the penalty matrix classifying the generic and rare cases based on the captured images.

2. The method of image processing of claim 1, wherein the first, second and combined deep neural networks are convolutional neural networks.

3. The method of image processing of claim 1, wherein the localizing step of discriminative class-specific features includes:
randomly extracting patches of the original data processed through the at least one class-specific feature spaces;
ranking randomly extracted patches by their statistical popularity among all patches of a same specified label;
bagging visual words features starting from the top-ranked patches;
random forest tree classifying of bag of visual words features; and
extracting variable importance measures using the random forest tree classification to localize discriminative class-specific features and estimate their relative importance.

4. The method of image processing of claim 1, wherein the training step of the second-deep neural network further includes:
resizing spatial-probabilistic labels;
creating batches of the original data with corresponding resized spatial-probabilistic labels to learn universal feature and decision spaces via back-propagation of feedback generated by a universal loss function;
estimating localization and probability of the discriminative class-specific features independently from the specified labels; and
classifying rare cases of the original data into the resized spatial-probabilistic labels.

5. The method of image processing of claim 1, wherein the training step of the combined deep neural network further includes:
combining the at least one universal feature space and the at least one class-specific feature space into at least one integrated feature space forming the primary combined class-specific and universal feature space with different learning rates;
combining the at least one universal decision space and the at least one class-specific decision space into at least one integrated decision space forming the primary combined class-specific and universal decision space; and
using a combined loss function of the universal loss function of the second deep neural network and a class-specific loss function of the first deep neural network to provide feedback for original data belonging to any label out of the primary combined specified and spatial-probabilistic labels.

6. The method of image processing of claim 5, wherein the learning rate of the universal feature space is smaller than the learning rate of the class-specific feature space.

7. The method of image processing of claim 1, wherein the training step of the second combined deep neural network further includes:
starting from the trained combined deep neural network;
extending feature and decision spaces by adding hidden layers with a purpose to increase network's capacity to host newly learned features and decisions; and
modifying a loss function of the second combined deep neural network or batches of unlabeled data by using more data samples for the rare cases, with higher penalty on misclassification based on the penalty matrix.

8. The method of image processing of claim 7, further comprising:
training a third combined deep neural network by:
supplying the original data containing the generic and rare cases, the specified labels and the penalty matrix; and
outputting primary combined decision and feature spaces used to classify both the generic and rare cases of the original data into the specified labels according to the penalty matrix.

9. The method of image processing of claim 8, wherein the training step of the third combined deep neural network further includes:
starting from the trained second combined deep neural network on the unlabeled data and the secondary misclassification labels;
extending classify the rare cases by adding hidden layers; and
modifying a loss function of the third combined deep neural network or batches of unlabeled data by using more data samples for the rare cases, with higher penalty on misclassification based on the penalty matrix.

10. The method of image processing according to claim 8, wherein:

the mapping step of primary combined labels into secondary combined misclassification labels together with the training steps of both the second and third combined deep neural networks form a small reinforcement loop; and
the steps from the training step of the first deep neural network to the training step of the third combined deep neural network form a big reinforcement loop.

11. A vehicle, comprising:
a path capturing unit configured to capture and convert portions of a followed path seen at least from a driver's point of view into a series of digital files, when the vehicle is driven,
a processor configured to process the series of digital files, and to classify generic and rare cases based on the series of digital files according to the image processing method of claim 10;
a display configured to display an information related to the classified generic and rare cases;
an autonomous driving unit configured to control the vehicle; and
a decision unit configured to activate at least one of the display unit and the autonomous driving unit depending on the classified rare cases.

12. The method of image processing of claim 2, wherein the localizing step of discriminative class-specific features includes:
randomly extracting patches of the original data processed through the at least one class-specific feature spaces;
ranking randomly extracted patches by their statistical popularity among all patches of a same specified label;
bagging visual words features starting from the top-ranked patches;
random forest tree classifying of bag of visual words features; and
extracting variable importance measures using the random forest tree classification to localize discriminative class-specific features and estimate their relative importance.

13. The method of image processing of claim 2, wherein the training step of the second-deep neural network further includes:
resizing spatial-probabilistic labels;
creating batches of original data with corresponding resized spatial-probabilistic labels to learn universal feature and decision spaces via back-propagation of feedback generated by a universal loss function;
estimating localization and probability of the discriminative class-specific features independently from specified labels; and
classifying rare cases of the original data into resized spatial-probabilistic labels.

14. The method of image processing of claim 3, wherein the training step of the second-deep neural network further includes:
resizing spatial-probabilistic labels;
creating batches of original data with corresponding resized spatial-probabilistic labels to learn universal feature and decision spaces via back-propagation of feedback generated by a universal loss function;
estimating localization and probability of the discriminative class-specific features independently from specified labels; and
classifying rare cases of the original data into resized spatial-probabilistic labels.

15. The method of image processing of claim 2, wherein the training step of the combined deep neural network further includes:
- combining at least one universal feature space and at least one class-specific feature space into at least one integrated feature space forming the primary combined class-specific and universal feature space with different learning rates;
- combining at least one universal decision space and at least one class-specific decision space into at least one integrated decision space forming the primary combined class-specific and universal decision space; and
- using a combined loss function of the universal loss function of the second-deep neural network and a class-specific loss function of the first deep neural network to provide feedback for original data belonging to any label out of the primary combined specified and spatial-probabilistic labels.

16. The method of image processing of claim 3, wherein the training step of the combined deep neural network further includes:
- combining at least one universal feature space and at least one class-specific feature space into at least one integrated feature space forming the primary combined class-specific and universal feature space with different learning rates;
- combining at least one universal decision space and at least one class-specific decision space into at least one integrated decision space forming the primary combined class-specific and universal decision space; and
- using a combined loss function of the universal loss function of the second-deep neural network and a class-specific loss function of the first deep neural network to provide feedback for original data belonging to any label out of the primary combined specified and spatial-probabilistic labels.

17. The method of image processing of claim 4, wherein the training step of the combined deep neural network further includes:
- combining at least one universal feature space and at least one class-specific feature space into at least one integrated feature space forming the primary combined class-specific and universal feature space with different learning rates;
- combining at least one universal decision space and at least one class-specific decision space into at least one integrated decision space forming the primary combined class-specific and universal decision space; and
- using a combined loss function of the universal loss function of the second-deep neural network and a class-specific loss function of the first deep neural network to provide feedback for original data belonging to any label out of the primary combined specified and spatial-probabilistic labels.

18. The method of image processing of claim 2, wherein the training step of the second combined deep neural network further includes:
- starting from trained combined deep neural network;
- extending feature and decision spaces by adding hidden layers with a purpose to increase network's capacity to host newly learned features and decisions; and
- modifying a loss function of the second combined deep neural network or batches of unlabeled data by using more data samples for the rare cases, with higher penalty on misclassification based on the penalty matrix.

19. The method of image processing of claim 3, wherein the training step of the second combined deep neural network further includes:
- starting from trained combined deep neural network;
- extending feature and decision spaces by adding hidden layers with a purpose to increase network's capacity to host newly learned features and decisions; and
- modifying a loss function of the second combined deep neural network or batches of unlabeled data by using more data samples for the rare cases, with higher penalty on misclassification based on the penalty matrix.

20. The method of image processing of claim 4, wherein the training step of the second combined deep neural network further includes:
- starting from trained combined deep neural network;
- extending feature and decision spaces by adding hidden layers with a purpose to increase network's capacity to host newly learned features and decisions; and
- modifying a loss function of the second combined deep neural network or batches of unlabeled data by using more data samples for the rare cases, with higher penalty on misclassification based on the penalty matrix.

* * * * *